United States Patent [19]
Kim et al.

[11] Patent Number: 6,070,077
[45] Date of Patent: May 30, 2000

[54] METHOD FOR SELECTING TRAFFIC CHANNEL OF MOBILE TELECOMMUNICATION BASE STATION

[75] Inventors: Dong-Myoung Kim, Kyoungki-do; Song-Kyu Lee, Seoul, both of Rep. of Korea

[73] Assignee: Hyundai Electronics Ind. Co., Ltd., Kyoungki-do, Rep. of Korea

[21] Appl. No.: 08/982,497

[22] Filed: Dec. 2, 1997

[30] Foreign Application Priority Data

Dec. 2, 1996 [KR] Rep. of Korea ............... 96-60982

[51] Int. Cl.$^7$ .................................................. H04B 1/38
[52] U.S. Cl. ........................................ 455/452; 455/509
[58] Field of Search .................................. 455/452, 453, 455/62, 509, 512, 513

[56] References Cited

U.S. PATENT DOCUMENTS

| | | | |
|---|---|---|---|
| 5,280,630 | 1/1994 | Wang .................................... | 455/56.1 |
| 5,345,597 | 9/1994 | Strawczynski et al. . | |
| 5,507,007 | 4/1996 | Gunmar et al. ...................... | 455/33.1 |
| 5,561,846 | 10/1996 | Hagio . | |
| 5,625,878 | 4/1997 | Lopponen et al. .................. | 455/34.1 |
| 5,757,787 | 5/1998 | Dent ..................................... | 370/330 |

Primary Examiner—Doris H. To
Assistant Examiner—N. Mehrpour
Attorney, Agent, or Firm—McAulay Nissen Goldberg & Kiel, LLP

[57] ABSTRACT

A method for selecting traffic channels of a mobile telecommunication base station is disclosed. Normal traffic channel elements and busy traffic channel elements are calculated and compared with each other, and a judgment is made as to whether there is a usable traffic channel element. Busy traffic channel elements of respective shelves are compared with each other to select a shelf having smallest busy traffic channel elements. Busy traffic channel elements of the selected shelf are compared with normal traffic channel elements of the same shelf, to judge as to whether there is a usable traffic channel element. A termination condition is incremented by 1 upon finding a usable traffic channel element, and a judgment is made as to whether the selected shelf index is smaller than a last shelf index. The channel card index is updated, and the self index is incremented by 1 upon finding the selected shelf index to be smaller than a last, and confirming the sequential selected shelf index. A traffic channel element is selected upon finding that the selected traffic channel element is in an idle state, and that the selected shelf corresponds to the shelf including the relevant traffic channel element.

11 Claims, 4 Drawing Sheets

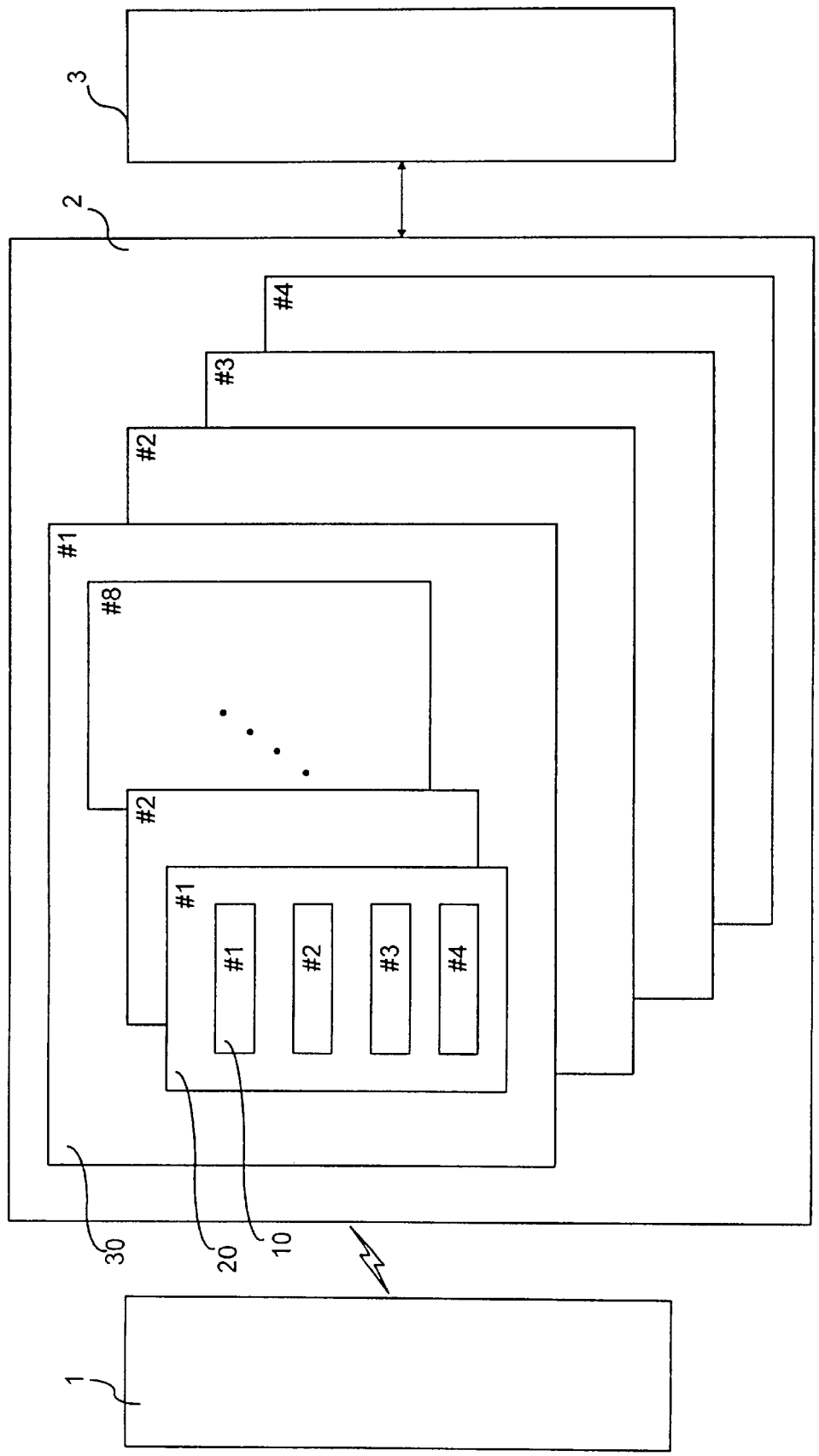

FIG. 3

| SHELF #1 | SHELF #2 | SHELF #3 |
|---|---|---|
| TRAFFIC CHANNEL ELEMENTS: 50 | TRAFFIC CHANNEL ELEMENTS: 20 | TRAFFIC CHANNEL ELEMENTS: 30 |
| BUSY ELEMENTS: 30 | BUSY ELEMENTS: 20 | BUSY ELEMENTS: 21 |
| IDLE ELEMENTS: 20 | IDLE ELEMENTS: 0 | IDLE ELEMENTS: 9 |

METHOD FOR SELECTING TRAFFIC CHANNEL OF MOBILE TELECOMMUNICATION BASE STATION

BACKGROUND OF THE INVENTION

1. Field of the Invention

The present invention relates to a mobile telecommunication system. Particularly, the present invention relates to a method for selecting traffic channels of a mobile telecommunication base station, in which the information capable of measuring the loads of the respective shelves is utilized, so that the selections of the traffic channel elements can be prevented from being concentrated on a particular shelf.

2. Description of the Prior Art

Generally, in a mobile telecommunication system, if a user inputs a telephone number, and presses a transmission key, the mobile station transmits an origination message to a base station. Upon receipt of the origination message, the base station allocates a traffic channel to the mobile station, and transmits the telephone number to a mobile switching center. During the time when the mobile switching center carries out the call set up, the mobile station receives base station signals through a forward channel, and begins to carry out a transmission through a reverse channel.

In this mobile communication system, if a call occurs, the conventional method for selecting the traffic channel element is such that a serial number is assigned both to the shelf and the channel card, and the channel cards are selected sequentially within the first shelf. Thus, all the available traffic channel elements are selected from the channel card, and then, a channel card is selected. In this way, when all the traffic channel elements of the channel card of the first shelf are checked, the system advances to the next shelf. Then, the traffic channel elements are selected from the next shelf based on the sequence within the channel card. When all the traffic channel elements are selected, traffic channel elements are selected from still next shelf. In this manner, conventionally, the shelves are sequentially selected, and the traffic channel elements of the channel cards are sequentially selected. Therefore, calls are concentrated on a particular shelf, while the remaining shelves and channel cards are left idle. Accordingly, even in a non-rush period, an overload is imposed, with the result that the system is grounded.

Therefore, the following method has been proposed and utilized. That is, the shelves and the traffic channel elements are assigned with index numbers. Then the shelves, the channel cards and the traffic channel elements are selected based on the index numbers, so that the selections can be uniformly dispersed to the respective shelves and channel cards.

In this method, however, the loads within the shelves are not taken into account, but the traffic channel elements are selected based only on the index numbers. In the actual operation, there are differences between the talking time periods of the subscribers. Due to these differences, if the subscribers who are assigned with the traffic channel elements of a particular shelf talk for a long time, then this particular shelf receives the greatest load. Even under this status, if more traffic channel elements are available, the selections are made, thereby more increasing the load of the shelf.

SUMMARY OF THE INVENTION

The present invention is intended to overcome the above described disadvantages of the conventional techniques.

Therefore it is an object of the present invention to provide a method for selecting traffic channels of a mobile telecommunication base station, in which the information capable of measuring the loads of the respective shelves is utilized, so that the selections of the channel elements can be prevented from being concentrated on a particular shelf.

In achieving the above object, the method of the present invention is characterized as follows. That is, the information which makes it possible to measure the loads of the respective shelves is utilized. Thus, a shelf which is imposed with the smallest load is selected, and the traffic channel elements of this shelf is selected. Then a judgment is made as to whether all the traffic channel elements are busy. For this purpose, a judgment is made as to whether the termination condition is smaller than the maximum traffic channel elements. When all the traffic channel elements are not busy, the system enters into a status confirming loop.

At the status confirming loop, the termination condition is incremented by 1, and a judgment is made as to whether the selected shelf is smaller than the maximum shelves. If it is smaller, both the shelf index and the channel card index are incremented by 1 respectively. At this selected shelf, an idle traffic channel element is selected. If there is no idle traffic channel element, the system enters into the status confirming loop. If there is an idle traffic channel element, the traffic channel element is selected.

In another aspect of the present invention, the respective shelves are assigned with index numbers, and sequential selections are made from the first shelf to the last shelf. When the last shelf is selected, the selection is resumed starting from the first shelf again. Further, index numbers are assigned to the channel cards of the selected shelf, and then, sequential selections are made starting from the first channel card to the last channel card. Further, the traffic channel elements of the selected channel card are assigned with index numbers in the same manner, and sequential selections are made starting from the first traffic channel element to the last traffic channel element.

BRIEF DESCRIPTION OF THE DRAWINGS

The above object and other advantages of the present invention will become more apparent by describing in detail the preferred embodiment of the present invention with reference to the attached drawings in which:

FIG. 1 is a block diagram showing the hardware constitution of the mobile telecommunication system according to the present invention;

FIG. 3 illustrates an example of the load status of the respective shelves.

DETAILED DESCRIPTION OF THE PREFERRED EMBODIMENT

Figure 2A:
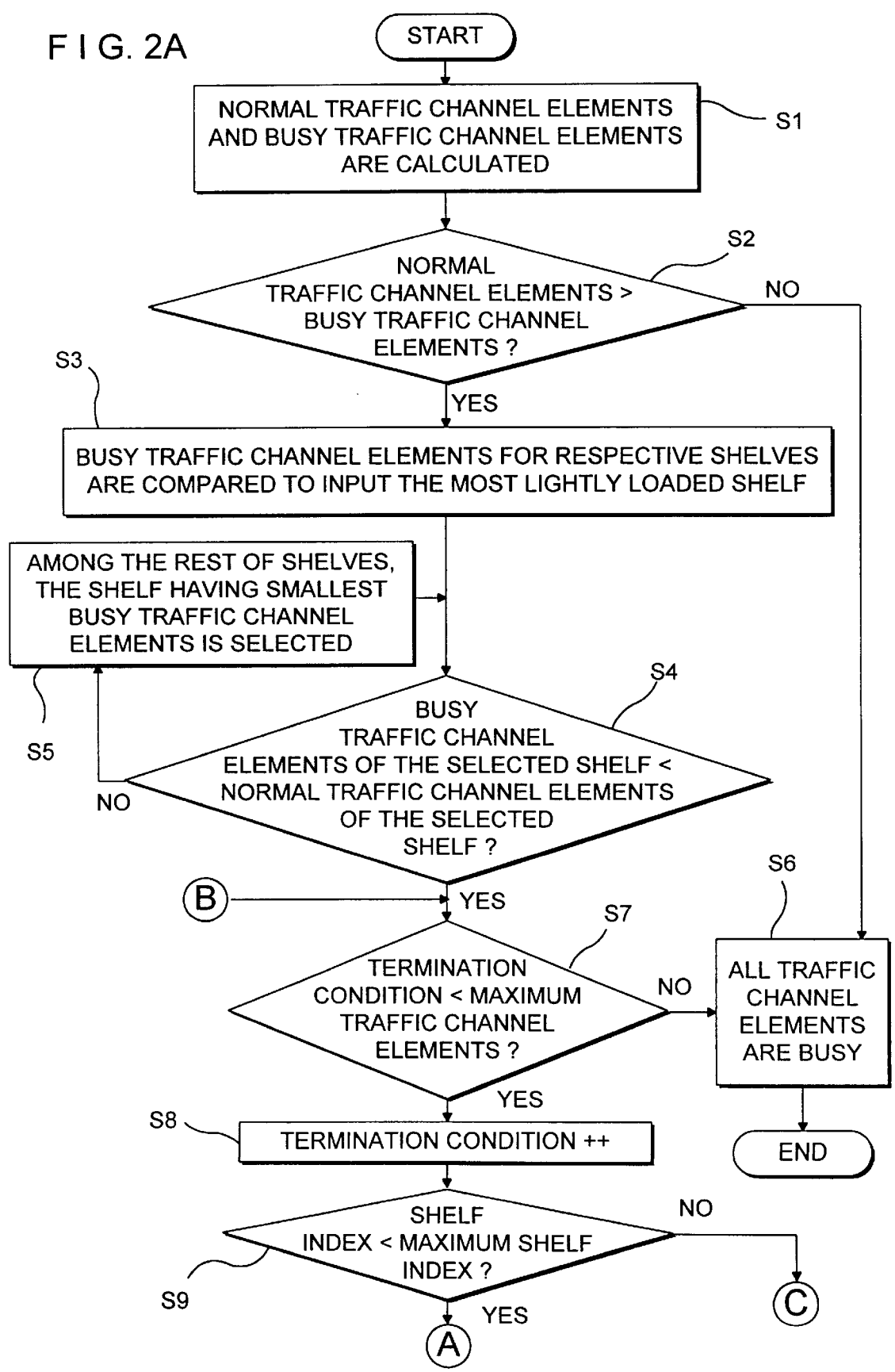
FIGS. 2A and 2B are flow charts showing the method for selecting traffic channel elements by utilizing the information capable of measuring loads according to the present invention.

FIG. 1 is a block diagram showing the hardware constitution of the mobile telecommunication system according to the present invention.

The mobile telecommunication system includes: a mobile station 1, i.e., a subscriber terminal such as car phone, portable phone and the like; a base station 2 provided for each cell and connected between the mobile station 1 and a control station 3, for transmitting and receiving various signal data through data links; and the control station 3 processing traffic channels and calls transmitted and received to and from a switching center (not shown in the drawing).

The base station 2 inputs timing signals, intermediate frequency signals and data/control signals, and includes a plurality of shelves 30 which are interfaced with other parts of the system. Each of the shelves 30 includes eight channel cards 20 which interface traffic signals from the mobile station 1, and which interfaces traffic signals from the control station 3. Each of the channel cards 20 includes four traffic channel elements 10 which modulates-demodulates signals which are transmitted and received between the mobile station 1 and the control station 3.

In the above described mobile telecommunication system, if a call occurs, then a traffic channel element is selected, and thus the call is proceeded. In the present invention, in order to select the traffic channel elements dispersedly from the shelves, the busy traffic channel elements for respective shelves are compared by utilizing shelf index numbers, channel card index numbers, and traffic channel element index numbers. Thus, the most lightly loaded shelf is selected.

In this state with the most lightly loaded shelf selected, a sequential selection is made starting from a first shelf #1 among four shelves #1–#4. Then a sequential selection is made starting from a first channel card #1 to a last channel card #8 which are contained in the selected shelf 30. Further, a sequential selection is made starting from a first traffic channel element #1 to a last traffic channel element #4 which are included in the selected channel card 20. Then a judgment is made as to whether the most lightly loaded shelf corresponds to the shelf in which the sequentially selected traffic channel element is included. Only if it corresponds, the traffic channel element 10 is selected.

In this manner, calls are allocated to the respective shelves 30, the respective channel cards 20 and the respective traffic channel elements 10. Even if the talking time of a call which is allocated to a particular traffic channel element is extended, the loads can be dispersed evenly to the shelves.

In order to evenly distribute the loads to the respective shelves, the following information which is capable of measuring the imposed loads of the respective shelves is utilized;

--- normal traffic channel elements = busy traffic channel elements of all the shelves + available traffic channel elements of all the shelves;
busy traffic channel elements = busy traffic
traffic channel elements of all the shelves; and
imposed load per shelf = (busy traffic channel per shelf/normal traffic channel per shelf) × 100.

---

The load of a shelf can be expressed by the busy traffic channel elements of the shelf. The available traffic channel element of a shelf can be expressed by the difference between the normal traffic channel elements and the busy traffic channel elements of the shelf.

Figure 2B:
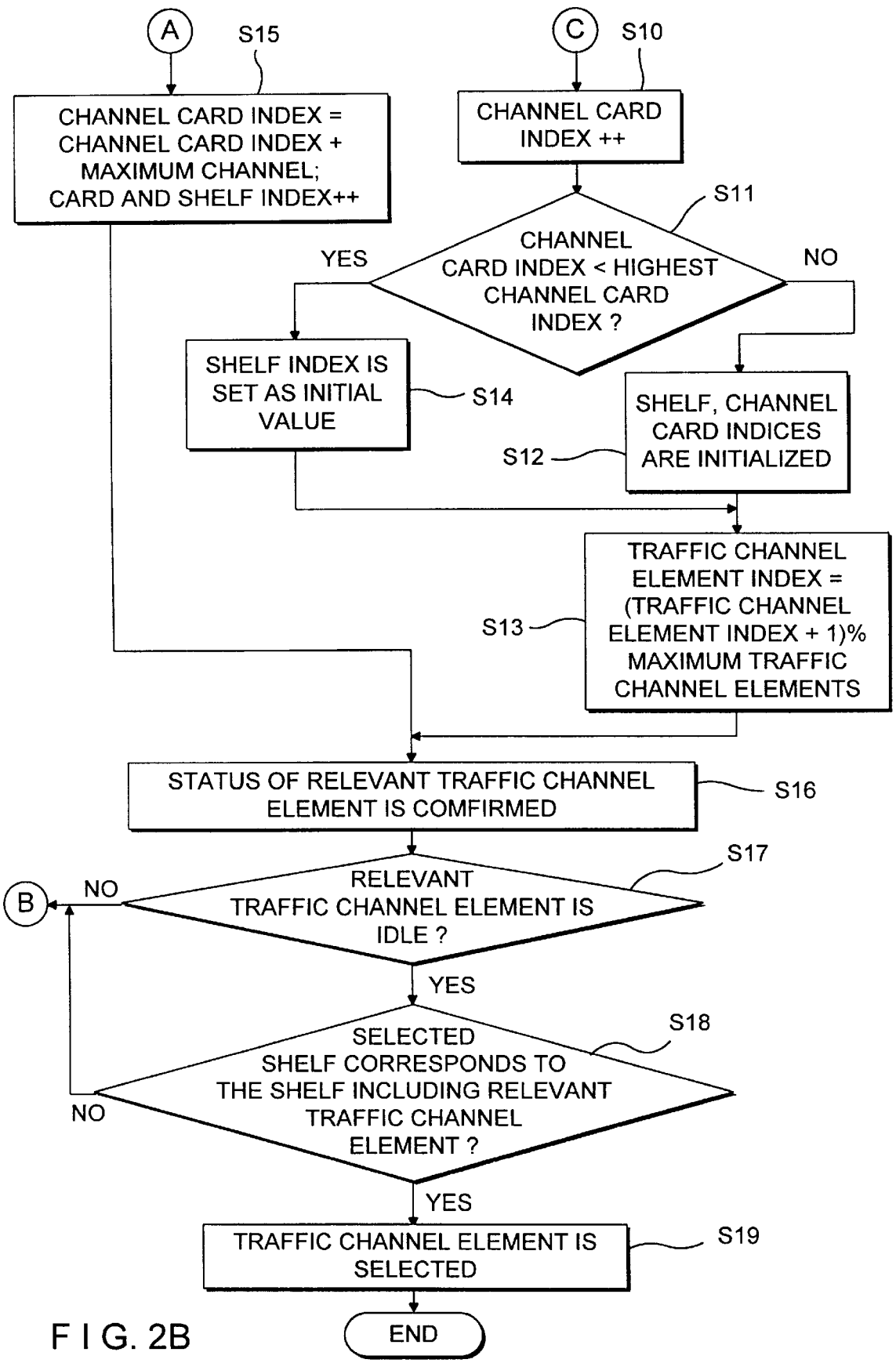

FIG. 2 is a flow chart showing the method for selecting traffic channel elements by utilizing the information capable of measuring loads according to the present invention.

At a step S1, calculations are made on the normal traffic channel elements (=busy traffic channel elements of all the shelves+available traffic channel elements of all the shelves) and on the busy traffic channel elements. At a step S2, the normal traffic channel elements and the busy traffic channel elements thus calculated are compared, and a judgment is made as to whether a traffic channel element is available.

If the normal traffic channel elements are not more than the busy traffic channel elements, then the program is terminated at a step S6, because all the traffic channel elements are busy. If the normal traffic channel elements are more than the busy traffic channel elements, then at a step S3, the busy traffic channel elements of the respective shelves are calculated, and they are compared with each other. Then the shelf which shows the smallest busy traffic channel elements is selected.

At the step S3, although the selected shelf has the smallest load, there may be no available traffic channel element. FIG. 3 illustrates an example of the load status of the respective shelves. As seen in the shelf #2, if the number of the traffic channel elements is 20, and at the same time, if the number of the busy traffic channel elements is 20, then there is no available traffic channel element although it may have the smallest load.

At a step S4, a judgment is made as to whether the busy traffic channel elements of the selected shelf is not more than the normal traffic channel elements of the selected shelf. If it is not more, then at a step S5, another shelf having the smallest number of the busy traffic channel elements is selected. Then the step S4 is repeated. If it is found to be more at the step S4, then the system advances to a step S7. At the step S7, a judgment is made as to whether the termination condition is smaller than the maximum traffic channel element (the total sum of the traffic channel elements of all the shelves). The termination condition shows a value in which an incrementation is made by 1 at each loop of confirming the busy status of the traffic channel loop, that is, each time when steps S7–S17 are gone through. Then a judgment is made as to whether this value is smaller than the maximum traffic channel elements. If it is not smaller, then at a step S6, the program is terminated because all the traffic channel elements are busy. At the step S7, if the termination condition is found to be smaller than the maximum traffic channel elements, then at a step S8, the termination condition is incremented by 1.

When all the shelves have been checked, the channel card index is incremented by 1. Then in order to check the respective shelves, a judgment is made as to whether the shelf index is smaller than the highest shelf index (for example 4) at a step S9. If the shelf index is smaller than the highest shelf index, then at a step S15, the highest channel card index is added to the channel card index to adopt it as a channel card index, and the shelf index is incremented by 1, because all the shelves have not been checked. Then the system proceeds to a step S16 at which the status of the relevant traffic channel element is confirmed.

At the step S9, if it is found that the shelf index is not smaller than the highest shelf index, then at a step S10, the channel card index is incremented by 1. Then at a step S11, a judgment is made as to whether the channel card index is smaller than the highest channel card index. If it is smaller, then at a step S14, it means that calls have been allocated up to the highest shelf (for example #4), but calls have not been allocated up to the highest channel card (#8). Therefore, in order to allocate the shelves starting from the first shelf, the shelf index is assigned with 0, and the system proceeds to the step S13. If it is not smaller, then at a step S12, the shelf index and the channel card index are assigned with an initial value (0). At the step S13, in order to select the current traffic channel element, the preceding traffic channel element index is incremented by 1. The remainder which is obtained by dividing the above value by the highest traffic channel element index value is adopted as the current traffic channel element index. Then the system advances to a step S16 at which the status of the relevant traffic channel element is confirmed.

At a step S17, a judgment is made as to whether the relevant traffic channel element is in an idle state. If it is not idle, then the status confirming loop of the steps S7–S16 is repeated. If it is idle, then at a step S18, a judgment is made as to whether the shelf selected at the step S4 corresponds to the shelf in which the channel element selected in the status confirming loop is included. If it does not correspond, then the status confirming loop of the steps S7–S17 is repeated. If it corresponds, then at a step S19, a traffic channel element is selected, and the program is terminated.

According to the present invention as described above, the information which is capable of measuring the loads imposed on the respective shelves is utilized, so that the loads can be made to be evenly distributed, thereby providing a high quality communication service.

What is claimed is:

1. A method for selecting traffic channels of a mobile telecommunication base station, comprising the steps of:

selecting the most lightly loaded shelf by utilizing information capable of measuring loads of respective shelves (first step);

sequentially selecting respective shelves, sequentially selecting a plurality of channel cards of the selected shelf, and sequentially selecting a plurality of traffic channel elements of the selected channel card (second step); and selecting a traffic channel element and assigning a call to it, if the most lightly loaded shelf corresponds to a shelf including the traffic channel element selected at the second step; and said information capable of measuring the loads further comprises:

--- normal traffic channel elements = busy traffic channel elements of all the shelves + available traffic channel elements of all the shelves, busy traffic channel elements = busy traffic channel elements of all the shelves, and imposed load per shelf = (busy traffic channel per shelf/normal traffic channel per shelf) × 100.

---

2. The method as claimed in claim 1, wherein at the second step, sequence indices are assigned on the shelves, channel cards and traffic channel elements; the shelves are sequentially and repeatedly selected starting from a first shelf index to a last shelf index; a last channel card index is added to the selected channel card index included in the selected shelf and sequentially selected, so as to update a channel card index; statuses of traffic channel elements included in the selected channel card are sequentially confirmed; and a judgment is made as to whether the selected traffic channel element is in an idle status.

3. The method as claimed in claim 2, wherein said indices of said shelves are sequentially selected starting from a low index to a highest index.

4. The method as claimed in claim 2, wherein said selected channel card index is added to a last channel card index to update the channel card index.

5. The method as claimed in claim 2, wherein statuses of said traffic channel elements are confirmed starting from a lowest index number to a highest index number.

6. A method for selecting traffic channels of a mobile telecommunication base station, comprising the steps of:

calculating normal traffic channel elements and busy traffic channel elements, comparing them with each other, and making a judgment as to whether there is an available traffic channel element;

comparing busy traffic channel elements of respective shelves with each other, to select a shelf having smallest busy traffic channel elements;

comparing busy traffic channel elements of the selected shelf with normal traffic channel elements of the same shelf, to judge as to whether there is an available traffic channel element;

incrementing a termination condition by 1 upon finding an available traffic channel element, and making a judgment as to whether the selected shelf index is smaller than a last shelf index;

updating the channel card index, and incrementing the shelf index by 1 upon finding the selected shelf index to be smaller than a last one, and confirming a status of the sequentially selected shelf index;

sequentially selecting the channel card indices, and sequentially selecting the traffic channel element indices to confirm a status of a selected traffic channel element, upon finding that the selected shelf index is not smaller than a last shelf index; and selecting a traffic channel element upon finding that the selected traffic channel element is in an idle state, and that the selected shelf corresponds to a shelf including the relevant traffic channel element.

7. The method as claimed in claim 6, wherein if normal traffic channel elements are not more than busy traffic channel elements, all the traffic channel elements are judged to be busy, and a termination is made; and if normal traffic channel elements are more than busy traffic channel elements, it is judged that there is one or more of the available traffic channel elements.

8. The method as claimed in claim 6, wherein the available traffic channel elements of a selected shelf is judged based on the following formula:

available traffic channel elements=normal traffic channel elements of selected shelf–busy traffic channel elements of selected shelf.

9. The method as claimed in claim 6, wherein the termination condition is incremented by 1 each time when a loop of confirming busy statuses of traffic channel elements during an occurrence of a call is gone through.

10. The method as claimed in claim 6, wherein the channel card index value is updated to a new value by adding a last channel card index to the current channel card index.

11. The method as claimed in claim 6, wherein the traffic channel element index is divided by a last traffic channel element index, and a remainder is taken to form a current traffic channel element index.

* * * * *